Nov. 28, 1961  E. RAHLFS ET AL  3,010,790
METHOD OF PREPARING HYDRAZINE SALTS
Filed July 28, 1958
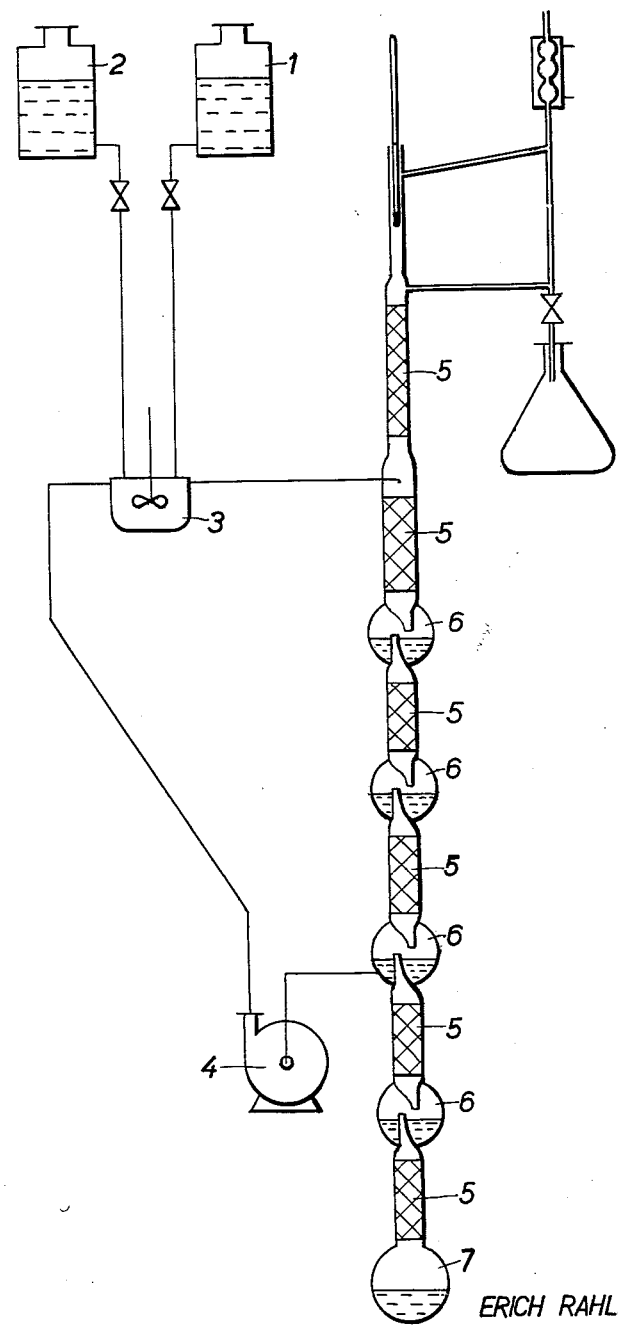
INVENTORS:
ERICH RAHLFS, WERNER THRAUM,
GÜNTER HENRICH.
BY
Burgen, Dinklage & Sprung
ATTORNEYS 3,010,790
METHOD OF PREPARING HYDRAZINE SALTS
Erich Rahlfs, Leverkusen-Bayerwerk, Werner Thraum, Leverkusen-Schlebusch, and Günter Heinrich, Opladen Germany, assignors to Farbenfabriken Bayer Aktiengesellschaft, Leverkusen, Germany, a corporation of Germany
Filed July 28, 1958, Ser. No. 751,520
Claims priority, application Germany July 31, 1957
3 Claims. (Cl. 23—117)

The present invention relates to a process for the production of hydrazonium salts.

The conversion of aqueous solutions containing acetone and hydrazine with acids to hydrazonium salts and the subsequent removal by distillation of the acetone thereby liberated is successful without loss of hydrazine only in very dilute solution. Bimolar or stronger solutions of hydrazone or diketazine, on the other hand give rise to disturbing reactions to a considerable extent when reacted with acids, which reactions lead to losses of hydrazine which are unacceptable from a manufacturing point of view.

The present invention is concerned with a process for the preparation of hydrazonium salts from aqueous solutions which contain the products of the reaction of hydrazine hydrate with acetone, by decomposition of the hydrazine-acetone compound, that is the ketazine or the acetone hydrazone by means of acid, which process consists in that the liberated acetone is distilled off in stages, each of which is always preceded by a time period interposed for the formation of the corresponding amount of acetone.

These undesired disturbing reactions can be satisfactorily limited if the acetone, which is liberated owing to the hydrazonium salt formation proceeding as a time reaction, is removed by distillation immediately after it has been formed. The concentration of free acetone is of far greater influence than that of the hydrazine on the said disturbing reactions, and it has been found advantageous to reduce this concentration to any desired extent by dilution with strong hydrazonium salt solution which is free from acetone.

Since the conversion of hydrazone or ketazine to the hydrazonium salt is a time reaction, the operative period after adding the acid cannot be shortened as desired, perhaps by immediately driving off the acetone, since such a procedure would, because of incomplete conversion, result in the concurrent evaporation of large quantities of hydrazine. It is therefore advisable to proceed in such manner that the solution to which acid is added in a mixing chamber first of all passes for a short period of time through a fractionating column which is adequate for the evaporation of the acetone which has up to then been liberated. This stage is followed by passage through a vessel in which the solution is held for a period of time (delay vessel) sufficient to form a further quantity of acetone to be distilled off in another fractionating column through which the solution has to pass. A few stages of this nature are sufficient to give a sump discharge which is free from acetone, without considerable formation of hydrazine in the distillate.

In accordance with the foregoing, it has also proved desirable for a suitable quantity of hydrazonium salt solution to be supplied simultaneously to the mixing chamber in which the addition of acid takes place, which solution is already substantially freed from acetone by evaporation. This is most simply effected by means of a circulation pump which is charged from a vessel of suitable content.

The invention is illustrated by the following example without being restricted thereto.

*Example*

For the preparation of dihydrazonium sulphate in accordance with the present process, an apparatus substantially as shown in the accompanying drawing is suitable, the said apparatus functioning in continuous manner as follows:

Aqueous hydrazine-acetone solution (120 g. of hydrazine hydrate and 400 g. of acetone per 1000 cc.) and sulphuric acid (substantially 80%) pass from the storage vessels 1 and 2 into the mixing chamber 3 in a stoichiometric ratio, this taking place at a speed of 1 litre per hour. The mixing vessel 3 is charged simultaneously, by means of the circulating pump 4, with 5 to 10 times the volume of dihydrazonium sulphate solution which is already substantially free of acetone. The acetone liberated at any time is driven off in the columns 5. The chambers 6 are vessels providing a length of stay (delay vessels). The gas heating of the sump flask 7 and the return to the upper column 5 are such that the boiling temperature in the sump is 105° C. and the transition temperature in the head is 70–80° C.

The acetone is obtained quantitatively as distillate together with a small proportion of hydrazine evaporated at the same time, while an acetone-free dihydrazonium sulphate solution is obtained as sump discharge.

We claim:
1. In the process for the production of hydrazine salts by the acid hydrolysis of an aqueous hydrazine solution containing a hydrazine acetone compound with the liberation of acetone, the improvement which comprises passing the hydrolysis reaction mixture in series through a multiple number of distillation stages for the distilling off of the acetone liberated during the hydrolysis, and storing a body of the liquid reaction mixture prior to each said distillation stage for a period of time sufficient to liberate substantially the amount of acetone distilled off in that stage.

2. In the process for the production of hydrazonium sulphate by the sulfuric acid hydrolysis of an aqueous solution containing the reaction product of hydrazine hydrate with acetone with the liberation of acetone, the improvement which comprises passing the hydrolysis reaction mixture in series through a multiple number of distillation stages for the distilling off of the acetone liberated during the hydrolysis and storing the body of the liquid reaction mixture prior to each said distillation stage for a period of time sufficient to liberate substantially the amount of acetone distilled off in that stage.

3. Improvement according to claim 1 which includes diluting the reaction mixture with hydrazonium salt solution which is free from acetone concurrently with the addition of the sulphuric acid used for the hydrolysis.

References Cited in the file of this patent
UNITED STATES PATENTS
2,537,791   Schwarcz _____ Jan. 9, 1951

OTHER REFERENCES

Audrieth and Ogg: "The Chemistry of Hydrazine," John Wiley and Sons, Inc., N.Y., 1951, page 44.

Gilbert: "Studies in Hydrazine, The Hydrolysis of Dimethylketazine and the Equilibrium Between Hydrazine and Acetone," Journal of the American Chemical Society, vol. 51, 1929, pages 3394–3409.

UNITED STATES PATENT OFFICE
CERTIFICATION OF CORRECTION

Patent No. 3,010,790                 November 28, 1961

Erich Rahlfs et al.

It is hereby certified that error appears in the above numbered patent requiring correction and that the said Letters Patent should read as corrected below.

In the grant, line 2, and in the heading to the printed specification, line 4, name of third inventor, for "Günter Heinrich", each occurrence, read -- Günter Henrich --; column 2, line 43, for "sulfuric" read -- sulphuric --; line 53, for the claim reference numeral "1" read -- 2 --.

Signed and sealed this 24th day of April 1962.

(SEAL)
Attest:

ESTON G. JOHNSON
Attesting Officer

DAVID L. LADD
Commissioner of Patents